(No Model.)
H. C. SEARS.
TWO WHEELED VEHICLE.
No. 280,524. Patented July 3, 1883.
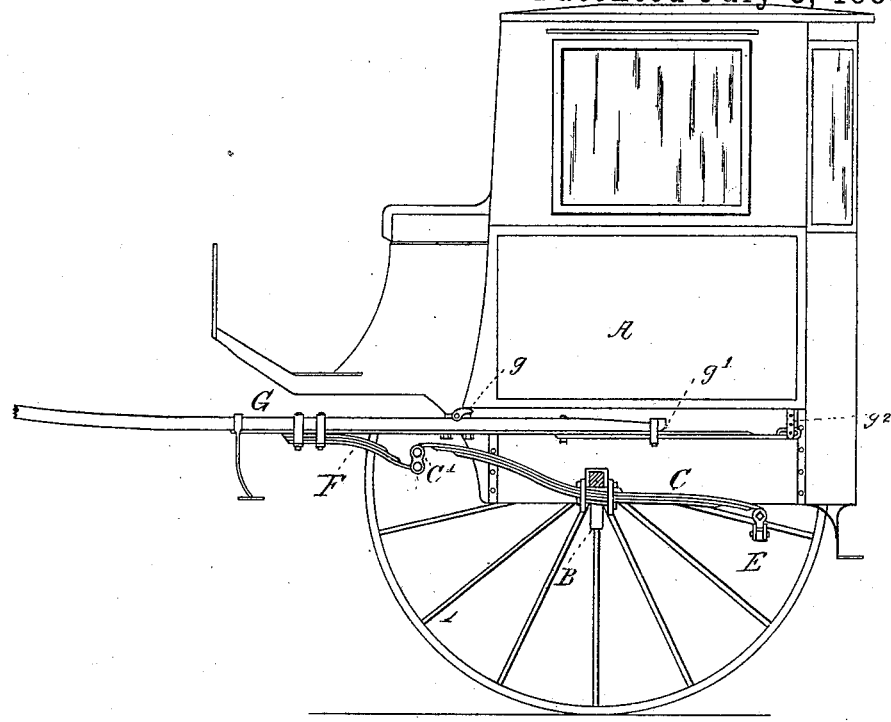
Fig. 1.
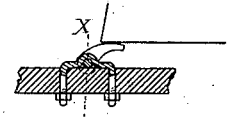 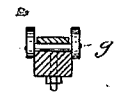 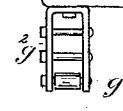
Fig. 2.  Fig. 3.  Fig. 4.
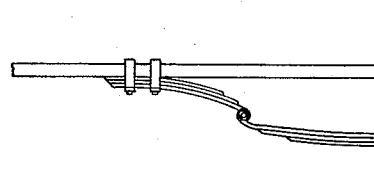 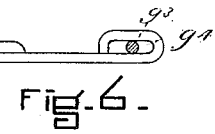
Fig. 5. Fig. 6.
WITNESSES
Bowdoin S. Parker
Fred Harris
INVENTOR
Henry C. Sears
by his attys
Clarke & Raymond

UNITED STATES PATENT OFFICE.

HENRY C. SEARS, OF BOSTON, MASSACHUSETTS.

TWO-WHEELED VEHICLE.

SPECIFICATION forming part of Letters Patent No. 280,524, dated July 3, 1883.

Application filed March 7, 1883. (No model.)

*To all whom it may concern:*

Be it known that I, HENRY C. SEARS, of Boston, in the county of Suffolk and State of Massachusetts, a citizen of the United States, have invented a certain new and useful Improvement in Vehicles, of which the following is a full, clear, and exact description, reference being had to the accompanying drawings, forming a part of this specification, in explaining its nature, in which—

Figure 1 is a side elevation of a vehicle containing the features of my invention. Fig. 2 is a view in detail, partly in section and partly in elevation, showing one method of hinging one of the shafts to the body of the vehicle. Fig. 3 is a vertical section upon the line $x\,x$ of Fig. 2. Fig. 4 is a view in end elevation, enlarged, which illustrates the method of supporting the end of the shaft-spring. Fig. 5 represents in side elevation a modification which is hereinafter referred to. Fig. 6 is an enlarged view of one end of the upper spring.

This invention is an improvement upon that described in Letters Patent No. 264,901, granted D. P. Nichols & Co., dated September 26, 1882; and it consists in a modification of the running-gear therein described, and in the method of hanging or attaching the shafts to the body of the vehicle. In my said Letters Patent the main side springs were attached at their forward ends directly to the shafts, and the shafts were pivoted or hinged to the front of the body of the vehicle. In my present invention I attach the forward ends of the main side springs, either directly or by means of links, to auxiliary springs which are attached to the shafts, and the shafts are extended backward from their pivotal points, and have a spring-extension, as hereinafter specified.

Referring to the drawings, A is the vehicle-body; B, the bent or crank axle; C, one of the main side springs, which is attached to the axle, as described in said Letters Patent. E is the rear cross-spring. F is one of the auxiliary springs, which is bolted or strapped to one of the shafts G, and to the end of which the front end, $c$, of the side spring, C, is secured, either directly or by means of the link $c'$, as represented in Fig. 1. Each shaft G is pivoted at $g$ to the front of the body of the vehicle, and has attached to its end the metal spring $g'$, which extends backwardly therefrom, and is secured to the side of the body of the vehicle at or near its rear end, as represented, preferably by means which will permit of a certain extent of vertical adjustment, whereby its tension may be varied. This device $g^2$, which I herein show, is represented in Fig. 4, and consists simply of two metal plates or arms attached to the body of the vehicle, and having holes for the reception of a cross-pin, $g^3$, upon which the end of the spring rests, or to which it may be hooked. This cross-pin (or it may be bolt) is moved up or down in the holes to adjust the tension of the springs or position of the shaft. By this construction I find that the motion of the shafts is not communicated to any extent to the body of the vehicle, and that it rides lightly and freely upon its supporting-springs.

In order to provide the shaft-spring with necessary play on its holding-pin $g$, I prefer to form upon its end the elongated hole $g^4$, either by bending the spring back upon itself, as represented, or in any other suitable way.

Having thus fully described my invention, I claim and desire to secure by Letters Patent of the United States—

1. In a two-wheeled vehicle, the combination of the crank-axle B, the hinged or jointed shafts G, the side springs, C, the auxiliary springs F, attached to the shafts and supporting the main springs C, the cross-spring E, and body A, all substantially as and for the purposes described.

2. The combination, in a two-wheeled vehicle, of the crank-axle B, the hinged or jointed shafts G and their springs $g'$, the main springs C, the auxiliary springs F, the cross-spring E, and the body A, all substantially as and for the purposes described.

3. The combination, in a two-wheeled vehicle, of the hinged or jointed shafts G, the main springs C, and the auxiliary springs F, all substantially as and for the purposes described.

HENRY C. SEARS.

Witnesses:
    F. F. RAYMOND, 2d,
    FRED. HARRIS.